Figure 1:
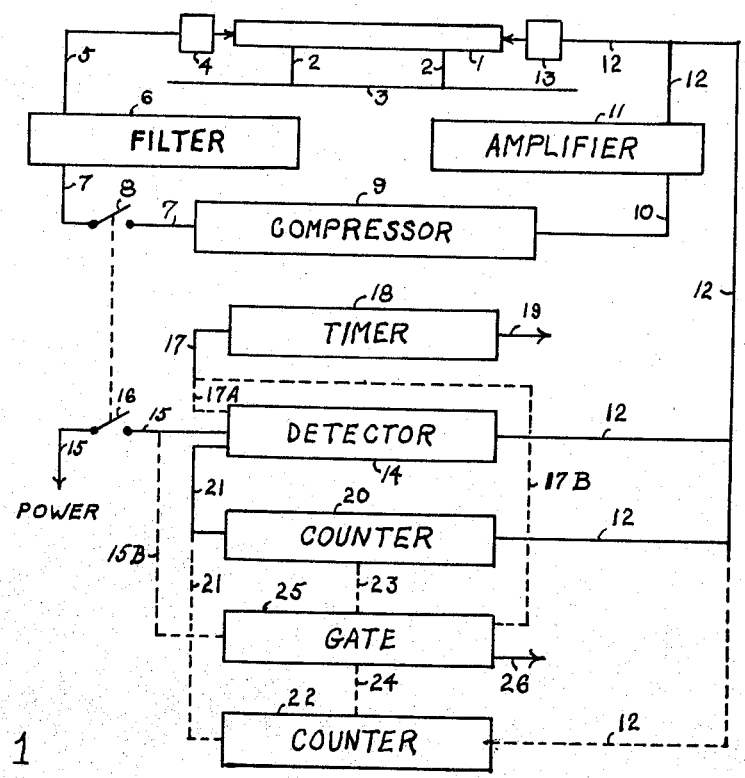

Oct. 10, 1967  R. G. ROWE  3,345,862
RESONANCE VIBRATION APPARATUS FOR TESTING ARTICLES
Filed Jan. 21, 1964

Robert J. Rowe
INVENTOR.

BY

United States Patent Office 3,345,862
Patented Oct. 10, 1967

3,345,862
RESONANCE VIBRATION APPARATUS FOR TESTING ARTICLES
Robert G. Rowe, Niagara Falls, N.Y.
(P.O. Box 112, Grand Island, N.Y. 14072)
Filed Jan. 21, 1964, Ser. No. 339,183
8 Claims. (Cl. 73—67.2)

This invention generally relates to testing and comparing the mechanical and physical properties of articles or bodies as determined from their natural frequencies of resonance vibration and, more specifically, to improved apparatus for exciting natural frequencies of vibration, measuring such frequencies and determining whether or not signal frequencies fall within predetermined frequency ranges.

Factors influencing the resonant frequency of mechanical vibration of articles are disclosed in the prior art, for example in U.S. Patent No. 3,059,468, entitled "Vibration Apparatus for Testing Articles," issued to the present inventor Oct. 23, 1962. Even more complete information has been disclosed in the Non-Destructive Testing Handbook published by the Ronald Press Company, New York, New York (1959) in Section 51 of volume II, written by the present inventor. The latter reference fully describes the principles and some practical applications of resonance vibration testing and introduces the premise that supposedly identical articles are truly identical only when their natural frequencies of vibration are the same. As will be apparent to those versed in the art, or as explained in the references, a number of different properties and characteristics of articles or bodies may be evaluated by the subject test.

Devices for measuring the frequencies of resonance vibration of articles are not new in the art to which this invention is directed. For example, U.S. Patent No. 2,486,984, "Vibration Apparatus for Testing Articles," issued to the present inventor on Nov. 1, 1949, describes methods and apparatus for exciting and measuring frequencies of resonance vibration and comparing the physical properties of articles therefrom. The apparatus of this reference patent has found wide commercial use in the United States and abroad in testing bonded abrasive articles, refractory bodies, bonded graphite, ceramic tile, bricks, metallic bodies and the like.

It may be helpful briefly to review some of the factors pertaining to resonance vibration testing which are disclosed more thoroughly in the references cited. The references justify the proposition that a series of supposedly identical articles, that is, articles for which careful control is exercised in their fabrication to insure they have identical finished properties, may be compared for variations of these properties from knowledge of their natural frequenties of resonance vibration. However, depending upon the particular property and its permissible tolerance, often it is not necessary that the natural frequencies of all of the articles in a series be identical or equal to some predetermined frequency in order to pass inspection by the resonance vibration test. Production processes may produce articles with natural frequencies falling within a range of frequencies and disposed along a type of distribution curve. Articles with frequencies falling within the center of the range may be acceptable whereas those falling outside selected upper and lower frequency limits may be unacceptable. Apparatus performing the test may be of the type which determines the natural frequency of vibration or which determines that the natural frequency of vibration does or does not fall within predetermined limits.

The references further emphasize the fact that metal, glass, ceramic and articles made of other materials of elastic character may have many modes of vibration. By the term "mode of vibration" is meant the pattern in which the article is vibrating. Different articles vibrating in identical modes have the same number of nodes and anti-nodes of vibration. "Nodes" of vibration are points of minimum vibration, whereas "anti-nodes" are points of maximum vibration. Because articles may have many modes of vibration, they may have an equal number of natural frequencies of resonance vibration, each natural frequency being specific to a particular mode of vibration.

For example, the hereinbefore identified reference to the Non-Destructive Testing Handbook teaches that if the frequency of the fundamental flexural mode of resonance vibration of a flawless article shaped like a bar is denoted by $f$, for example, the natural frequency of the first overtone flexural mode of vibration will be approximately 2.74 times $f$. While only this simple case is reviewed here, actually there are many overtones of flexural vibration and hence many natural frequencies of resonance vibration. Prior art devices which are limited to exciting and measuring a natural frequency of vibration may excite and measure one of the overtone resonance frequencies rather than the particular fundamental resonance frequency desired. Thus, acceptable articles may be rejected or, alternatively, unacceptable articles may be accepted. Improved methods and apparatus for resonance vibration testing should discriminate against undesired natural frequencies of vibration.

Further, as the test is applicable to many articles of manufacture, improvements in test methods and apparatus are highly desirable so that the unit time and cost to test each article will be kept abreast of the progressively lowering unit time and cost to manufacture each article. Still further, as the tolerances in dimensions, modulus of elasticity, modulus of rupture, density and the like become more rigid in manufactured articles, apparatus for the resonance vibration test must be made more accurate and free from possible error.

It is, therefore, an object of the present invention to provide apparatus less susceptible to errors caused by false mode or overtone vibration.

Another object of the invention is to provide apparatus which reduce the time required to test articles by the resonance vibration test.

Still another object is to provide apparatus which reduce the cost to so test articles.

Yet another object is to provide apparatus which eliminate the need for an operator.

A further object of the invention is to provide apparatus which reduce the human error.

Still a further object is to provide apparatus which are more amendable to inclusion in mechanized processes.

These objects are accomplished to a high degree by the methods and apparatus described in my co-pending application Ser. No. 325,223, filed Nov. 21, 1963, now abandoned, and likewise entitled "Resonance Vibration Apparatus for Testing Articles." Here elements are arranged to apply to an article a forcing vibration of continually changing frequency scanning a predetermined frequency range in a predetermined time and to determine whether the frequency of resonance vibration of the article lies within the range, or to indicate either the frequency of vibration of the article or of the exciting source provided that the article vibrates in resonance in the predetermined time.

On the other hand I have been able to eliminate the necessity for scanning a predetermined frequency range and adjusting a variable frequency oscillator to resonance with the natural frequency of vibration of the articles under test in order to establish resonance vibrations in the articles and to measure the frequencies of resonance vibration. In the present invention I may accomplish the above objects, and other objects ancillary thereto, without scanning by using a particular combination of mechanical and electrical elements arranged to employ the article under test as an element in a closed-loop electromechanical feedback system in which the frequency of mechanical and electrical oscillation is determined by the natural frequnecy of resonance vibration of the article.

The novel features which I believe to be characteristic of my present invention are engendered with particularity in the appended claims. The invention itself, however, best will be understood by reference to the accompanying detailed description and drawings, in which FIGURE 1 diagrammatically illustrates a preferred embodiment of the invention.

Figure 2:
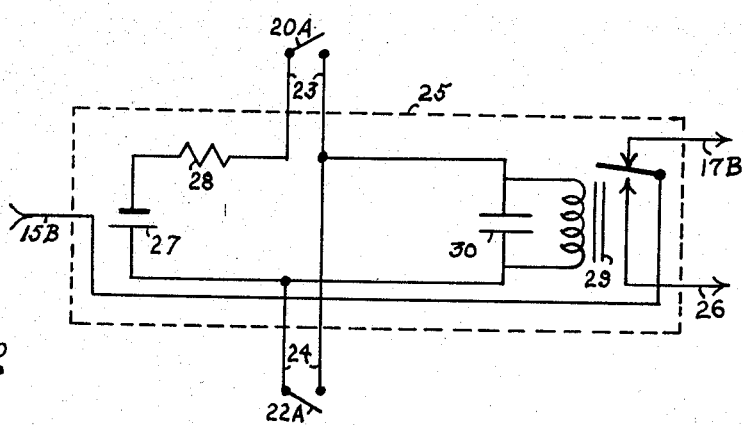

FIGURE 2 schematically illustrates circuit details of a gate diagrammatically illustrated in FIGURE 1.

With reference to FIGURE 1, article 1 being tested is shown resting on supports 2 which may be attached to table 3. That the supports may be located at nodes of a preferred mode of vibration to reduce damping of the vibrations is detailed in the prior art and references introduced hereinbefore.

Mechano-electrical transducer 4 is shown with its vibratile stylus touching article 1 in order to receive mechanical vibrations therefrom and to convert them into alternating currents or voltages of equivalent frequency. Such a vibration detecting means as transducer 4 conveniently may be a Model 51–1 Phonograph Pickup as manufactured by the Astatic Corporation, Conneaut, Ohio, for example. Both reference patents illustrate and describe how a microphone may be substituted for the vibration pickup for certain applications.

In turn, the electrical output of transducer 4 is shown connected by lead wire 5 to the input of filter 6. Filter 6 may be a band-pass filter such as the Model 310–AB Variable Electronic Band-Pass Filter manufactured by the Krohn-Hite Corporation, Cambridge, Mass., for example. Such filters are provided with two dials calibrated in frequency in cycles per second to set both the upper and the lower frequency limits of the pass band. In the pass band between the upper and lower frequency limits such filters have zero insertion loss. In other words, signals applied to the input of the filter which have frequencies falling within the pass band, as defined by the preadjusted upper and lower limits, are passed to the output of the filter without attenuation. On the other hand, signals applied to the input of the filter which have frequencies falling above or below the pass band do not reach the output of the filter without attenuation.

In FIGURE 1 the output of filter 6 is shown connected by lead wire 7 through switch 8 to the input of compressor 9. Compressor 9 typically may be a Model AFC–2 Audio Compression Amplifier manufactured by P & H Electronics Company, Lafayette, Ind.; or the Model CA–1503 Regulated Output Amplifier manufactured by Peer, Incorporated, Benton Harbor, Mich., for example. As is well known to those versed in the art, such automatic volume compressors, limiters or regulators are designed so that the gain between the input and output terminals varies inversely with the amplitude of the signal or voltage at the input or output terminals. By appropriate circuit design the variation in gain or amplification vs. signal amplitude may be caused to be approximately linear or suitably non-linear as desired. These devices often are employed in the modulation circuits of broadcast transmitters to prevent overmodulation distortion with strong audio signals, yet insure a high level of modulation even with relatively weak audio input signals. They may be provided with two controls; one to adjust the overall gain and one to adjust the degree of compression.

Returning to the drawing and FIGURE 1, the output of compressor 9 is shown connected through lead wire 10 to the input terminals of amplifier 11. Amplifier 11 is chosen to provide approximately linear current, voltage or power amplification as required by further elements of the invention. Amplifier 11 need not be further described as such amplifiers are well known in the electronic art. The output of amplifier 11 is shown connected through lead wire 12 to electro-mechanical transducer 13. Such a vibration exciting means as transducer 13 conveniently may be a Model M41–500 Magnetic Recording Head as manufactured by the aforementioned Astatic Corporation. Transducer 13 is shown with its vibratory stylus touching article 1 in order to impart electrically generated mechanical vibrations thereto. As will be recognized by those versed in the art, actually the coupling between article 1 and either transducer 4 or 13 may be acoustic, electrostatic, electromagnetic or otherwise depending in part upon the nature of the properties of article 1 and the particular type of transducer employed. Further, it will be recognized that all of the electrical and electromechanical elements illustrated and described should be capable of operation over the frequency range of the natural frequencies of vibration of the articles to be tested.

With the elements and the interconnections of the elements of a modification of a preferred embodiment of the present invention described in some detail, their cooperative operation perhaps is best described by a typical example.

Assume that the natural frequency of the fundamental flexural mode of vibration in bar-shaped articles typified by article 1 in the drawing is to be excited. Further, assume that the range of frequencies to be expected in acceptable articles vibrating in this mode has upper and lower frequency limits of 1100 and 900 cycles per second, respectively. Filter 6 is set to 1100 and 900 cycles per second. Closure of switch 8 completes the closed-loop electromechanical feedback system including article 1, vibration pickup 4, filter 6, compressor 9, amplifier 11 and vibration exciter 13. Because, as yet, article 1 is not vibrating, the output voltage from vibration pickup 4 through filter 6 to the input of compressor 9 is zero. With zero voltage at the input, the gain or amplification of compressor 9 is at its predetermined maximum due to the inverse relationship between input voltage and gain as previously described. Electrical instabilities or noise in the electrical circuit elements produce random output voltage fluctuations from amplifier 11 which are connected to vibration exciter 13 where they are converted to random mechanical vibrations and coupled to article 1. These random mechanical vibrations shock excite vibrations in article 1, including vibrations at the fundamental and overtone frequencies. The vibrations are received by vibration pickup 4, converted to voltages of the fundamental and overtone frequencies and impressed on the input of band-pass filter 6. Band-pass filter 6 passes without substantial attenuation only the voltages of the frequency of the fundamental mode of vibration through compressor 9 to the input of amplifier 11. Here they are amplified and connected to vibration exciter 13 where they are converted to vibrations of the frequency of the desired fundamental mode of vibration and coupled to the article. This action strengthens the vibration of article 1 at the natural frequency of vibration of its fundamental flexural mode of vibration.

By the nature of the closed loop electromechanical feedback system, reinforcement of the fundamental flexural mode vibrations in article 1 continues progressively to reinforce the amplitude of oscillations in the electrical elements, still further strengthening the amplitude of article vibrations. Thus build-up of mechanical and electrical oscillations would continue to the level where elements of the system became overloaded to the point of distortion were it not for the action of an amplitude limiting means such as compressor 9. The gain and compression or regulating characteristics of compressor 9 are selected or adjusted with suitable controls so that system oscillation will be initiated and build up to amplitudes sufficient to maintain oscillation without overloading any elements of the system to the point of distortion or spurious frequency generation. It will be apparent that articles of the aforementioned series sequentially may be placed in the position of article 1, in contact with the styluses of transducers 4 and 13, and sequentially cause to vibrate at their individual natural frequencies of resonance vibration.

The methods and apparatus so far described have a number of advantages over prior art systems. For example, filter means 6 prevents oscillations from initiating and building up at undesired mode or overtone frequencies not representative of the desired natural frequency of the fundamental flexural mode of vibration. If oscillations built up at the frequency of the first overtone mode of flexural vibration, for example, the measured frequency would be some 2.74 times higher than the expected frequency and an acceptable article could be rejected as possessing an incorrect natural frequency of resonance vibration. Filter 6 prevents this from occurring by effectively limiting system oscillation to a predetermined range of frequencies.

Further, there is the advantage that the desired natural frequency of vibration may be established in the article in a very short time. While the description of oscillation build-up has been rather lengthy, actually it may require only a matter of some 0.1 to 1.0 seconds depending in part upon system gain, system power and the mass of the article being tested. The action of compressor 9 enhances the operation of the system, but before enlarging on its particular function it may be of interest to study a similar closed loop electromechanical feedback system excepting that suppressor 9 is by-passed or eliminated. The amplification of the amplifying portion of the system could be made manually adjustable by a conventional gain control or attenuator in amplifier 11, for example. With article 1 in position on supports 2, and in contact with the styluses of transducers 4 and 13, closure of switch 8 completes the circuit of the electromechanical feedback loop. The gain control on amplifier 11 might be fully advanced to provide maximum system gain. This would insure minimum build-up time for the amplitude of article oscillations. Through the processes described hereinbefore, mechanical and electrical oscillations build up in article 1 through feedback, but continue to increase indefinitely to overload the electrical elements of the system. Overload of the electrical elements of the system produces harmonic distortion and spurious frequencies. This increases the chances for rejecting otherwise acceptable articles, as frequency measuring equipment may measure the harmonic or spurious frequency.

In an effort to minimize overload, the gain control on amplifier 11 might be reduced to the point where the overall system gain is barely sufficient to overcome system losses and to initiate oscillation. In this case, first, mechanical and electrical oscillations will build up much more slowly than before. Secondly, it may occur that the damping losses in a second article, or the losses in the imperfect contacts between a second article and the transducers, may be higher than in the instance cited just above. With higher overall system losses the system gain may be so low that mechanical and electrical oscillations will not be initiated, again increasing the chance for rejection of an otherwise acceptable article.

On the other hand these problems are either eliminated entirely or minimized to an optimum degree with suppressor 9 included in the feedback loop. At the instant of completing the electro-mechanical feedback loop, as illustrated by closure of switch 8, the article is not vibrating and the input voltage through transducer 4 and filter 6 to compressor 9 approximates zero. Because of the inverse relationship between the compressor input voltage and compressor gain, the gain of compressor 9 is high and system oscillations build up rapidly inasmuch as the net loop gain of the overall system is high. However, again because of the inverse relationship between compressor gain and input voltage, when electrical voltage oscillations in the system build up to a desired degree the gain of compressor 9 automatically reduces in a desirable way so as to prevent overload and distortion yet maintain strong oscillations. Still further, variations in system losses caused by variations in the vibration damping or attenuating characteristics of the different articles under test, or by variations in the contact losses between the different articles and the transducer styluses, are compensated by compressor 9. Compressor 9 insures a predetermined maximum gain to initiate oscillations as rapidly as possible and, as oscillations build up, provides a predetermined attenuation of gain to maintain oscillations at a level below overload and attendant distortion.

It will be recognized by those versed in the art that there are other methods or circuit techniques for limiting voltage amplitude. For example, a conventional clipper or limiter circuit using shunt-connected biased diodes may be employed to clip off the peak positive and negative signal voltage excursions exceeding any predetermined level through diode bias adjustment. Voltage limiting means of the type described are to be preferred, however, in that some other techniques introduced severe signal distortion.

It is to be pointed out that the electromechanical feedback loop has been illustrated and described as including linear amplifier 11. The primary purpose of amplifier 11 is to provide sufficient current, voltage or power amplification to overcome system losses to the point where sustained oscillations can occur in the feedback loop. More amplification is necessary when articles with a large mass or a high damping factor are to be tested, because considerable power may be required to initiate and sustain oscillations in massive articles or to overcome the energy consumed by internal friction in poorly elastic articles. On the other hand, when testing relatively small, highly elastic (low loss) articles, the gain and power available from the controlled amplifier of compressor 9 may be entirely adequate and amplifier 11 may be eliminated.

Further, it will be recognized by those versed in the art that, while the band-pass filter and the compression amplifier are required for the apparatus to function as described, it is possible to interpose them or substitute one for the other in the feedback loop. The commercially available filters selected for illustration are designed to operate at relatively low power levels. Thus, the filter is shown connected between the low-level output of transducer 4 and the low-level input of compressor 9. Similar filters, but with higher power handling abilities, could be connected at the output of the compression amplifier or the linear amplifier if used.

Having disclosed the individual and cooperative function of the elements so far presented, which cooperate to excite desired natural frequencies of vibration in articles, further modifications of the invention will be illustrated and described.

Returning to FIGURE 1, the output of amplifier 11 is shown connected by lead wire 12 to transducer 13 and further connected by a branch of lead wire 12 to resonance detector 14. Detector 14 may be a simple voltage-actuated relay, well known to those versed in the art. The relay of detector 14 is selected and arranged to actuate when the voltage impressed on its coil by amplifier 11 through lead wire 12 exceeds a predetermined value. Means to set the critical operating value are well known to those versed in the art and include, in addition to selection of the characteristics of the coil of the relay, adjusting the contact spacing and spring tension. In this modification the relay of detector 14 is provided with single-pole, double-throw contacts. The common contact of the relay is connected through lead wire 15 and switch 16, as shown, to a suitable source of power. The normally-closed contact, being the contact which remains in connection with the common contact when the coil of the relay is not energized and the relay not actuated, is connected by lead wires 17A and 17 to the motor, control and signalling circuits of signalling timer 18. Timer 18 may be of the recycling or time delay type manufactured by the Industrial Timer Corporation, Parisippany, N.J., for example. Familiar to those versed in the art, such timers include a small constant speed electric motor driving adjustable cams and cam-operated switches, as well as optional lamp or bell alarms. These may be connected to provide a visual or audible alarm or to actuate an electric circuit upon elapse of an adjustable time interval after motor energization. Electrical output may be taken from timer 18 by lead wire 19.

Further, in FIGURE 1, the output of amplifier 11 is shown connected by a branch of lead wire 12 to the frequency counting input of electronic frequency counter 20. Well known to those versed in the art, the latter conveniently may be a Model 521–A Industrial Frequency Counter manufactured by the Hewlett-Packard Corporation, Palo Alto, Calif., for example. Counter 20 also is provided with a "reset" or "count-command" input so arranged that a signal or voltage applied thereto will cause the counter to count and indicate in cycles per second the frequency of the signal or voltage connected to its frequency counting input.

Still further, in FIGURE 1, the normally-open contact of the relay of detector 14, being the contact with which the common contact makes connection when the coil of the relay is energized and the relay actuated, is connected by lead wire 21 to the count-command input of counter 20 described above. When the relay is actuated, the common contact (lead wire 15) transfers from the normally-closed contact (lead wire 17A) to the normally-open contact (lead wire 21). By this action the circuit from lead wire 15 to lead wires 17A and 17 is broken, whereas the circuit from lead wire 15 to lead wire 21 is completed and counter 20 is signalled through lead wire 21 to initiate its counting cycle.

It is to be noted that lead wire 17 is broken into dashed portions 17A and 17B because of alternate routing for alternate modifications of the apparatus. In the present modification being described, lead wire 17B is not used or connected.

With these added elements, as well as their interconnections, described in some detail the functioning of the apparatus will be described. The action of switch 8, in completing the feedback circuit to initiate natural frequency resonance vibrations in article 1, already has been described. Switch 8, further, may be mechanically connected to switch 16 as illustrated by the dashed line connection in FIGURE 1 such that switches 8 and 16 may be closed simultaneously. Timer 18 may be adjusted for 2 seconds, for example, to provide a visible, audible or electrical signal upon elapse of 2 seconds following energization. The period of 2 seconds is merely illustrative and may be greater or smaller depending upon the application. Generally, timer 18 will be adjusted for the shortest time commensurate with sufficient time to insure oscillation build-up in the feedback loop.

Assuming that article 1 will vibrate at some frequency within or near the pre-adjusted pass band limits of band-pass filter 6, at the instant of closure of switch 8 the mechanical and electrical oscillations will be initiated in the feedback loop as described hereinbefore. At this instant the output voltage of amplifier 11 conected by lead wire 12 to the coil of the voltage-actuated relay of detector 14 will be low and below the critical operating value for actuation of the relay. Hence, the normally-closed contacts of the relay of detector 14 will remain closed.

Simultaneous closure of switch 16 completes the circuit from the source of voltage or power through lead wire 15, the normally-closed contacts of the relay of detector 14 and lead wires 17A and 17 to the motor of signalling timer 18. This action energizes the motor of timer 18 which begins its pre-adjusted run of 2 seconds. As mechanical and electrical oscillations build up in the feedback loop, the output voltage of amplifier 11 builds up or increases in proportion. Through lead wire 12 the increasing output voltage of amplifier 11 is impressed on the coil of the relay of detector 14. Prior to the elapse of 2 seconds from the instant of timer motor energization, the amplitude of electrochemical oscillations builds up to the level where the amplifier voltage impressed on the relay coil exceeds the value required for actuation and the relay is actuated. As explained hereinbefore, actuation of the relay breaks the connection from lead wire 15 to lead wires 17A and 17. Thus, voltage is removed from timer 18 prior to the elapse of 2 seconds and no audible, visible or electrical output signal is produced thereby.

Further, actuation of the relay of detector 14 makes the connection from lead wire 15 to lead wire 21. Thus, voltage is applied through lead wire 21 to the count-command input of requency counter 20, the frequency counting input of which already is connected through lead 12 to the feedback loop. This action causes counter 20 to count and indicate the frequency of oscillation of the electromechanical feedback loop and, hence, the desired natural frequency of vibration of article 1.

The fact that article 1 is vibrating at a frequency within or near the pre-adjusted pass band limits of band-pass filter 6 is attested to by the fact that a signal appears on lead wire 21, that counter 20 counts and indicates a frequency and that no signal is produced by signalling timer 18.

Conversely, assuming that article 1 will not vibrate within or near the pass band limits of band-pass filter 6, closure of switch 8 will not initiate mechanical and electrical oscillations in the electromechanical feedback loop. Simultaneous closure of switch 16 completes the circuit from the source of power or voltage through lead wire 15, the normally-closed contacts of the relay of detector 14 and lead wires 17A and 17 to the motor of timer 18. As before, this action energizes the motor of timer 18 which begins its run of 2 seconds. As oscillations do not build up, the output voltage of amplifier 11 remains below that required for actuation of the relay of detector 14 which maintains voltage on timer 18. After the elapse of 2 seconds from the instant of switch closure, timer 18 runs out its pre-adjusted time interval of 2 seconds and produces an audible, visible or electric signal, signalling and indicating that article 1 will not vibrate at a frequency within or near the pre-adjusted pass band limits of band-pass filter 6. Further indication that article 1 is not vibrating is given by the fact that no signal appears on lead wire 21.

It will be apparent that articles sequentially may be placed on the supports by manual or mechanical means, that vibrations may be excited in those articles manifesting natural frequencies of resonance vibration within predetermined limits, that an indication may be given of the existence of resonance vibrations, that an indication may be given of the lack of resonance vibrations and that the frequency of resonance vibrations may be determined.

The methods and apparatus described so far have a number of advantages and desirable features. The feedback method of self-exciting vibrations demands but a minimum of time to establish vibrations. The action of the compressor, in providing a maximum initial system gain in the feedback loop, insures the rapid start of electromechanical oscillations.

On the other hand, this particular electromechanical feedback arrangement may be so adjusted that the resonant oscillations will not increase indefinitely in amplitude and overload elements of the system. The action of the compressor, in limiting the gain of the feedback loop once oscillations have built up to a suitable amplitude, insures that waveform distortion and the attendent possibility of error in frequency measurement will not occur.

Further, the upper and lower frequency limits of the pass band of the band-pass filter separately may be adjusted so that only the desired mode of vibration may be excited. False mode or overtone vibrations, producing erroneous frequencies, may not be excited in the articles under test.

Still further, the apparatus provides a measurement and indication of the natural frequency of resonance vibration of the articles under test without manipulation and provides signals to the effect that the articles do or do not vibrate in the expected frequency range. That these signals may be employed in a number of ways in either manual or mechanized systems to control apparatus for accepting satisfactory articles and rejecting unsatisfactory articles will be apparent to those versed in the art.

Still another modification of an embodiment of the present invention will be shown and described. There are applications of the resonance vibration test in which it is common to establish exceedingly close limits on the frequency range within which articles will be accepted and outside of which articles will be rejected. It will be apparent to those versed in the art that the attenuation characteristics of the type of band-pass filter characterized by filter 6 in the drawing may not be sufficiently sharp to prevent self-excited feedback oscillations in an article whose natural frequency of resonance vibration is just outside the pass band. However, I have found that a further modification of this embodiment of the invention will enable establishing extremely close limits for the frequency range within which acceptable articles lie. In fact, by the methods and apparatus to be described, the pass band or article acceptance band may be made as broad or as narrow as desired, and with extremely definitive and reproducible limits in the order of plus or minus one cycle per second.

Returning to FIGURE 1, in this next modification all of the elements so far described may be the same, except that electronic frequency counter 20 is replaced with a predetermined frequency counter such as the Series 2300 Industrial Preset Counter manufactured by Micro Measurements Corporation, Melrose Park, Ill., for example. It may bear mentioning that this latter counter is suitable for the frequency counting functions of the foregoing modifications, except that it is more elaborate than necessary.

Predetermined or preset frequency counters have been produced and used for a number of years and are well known to those versed in the art. Not only are they arranged to count and indicate the frequency of signals applied to their frequency counting input, but they are arranged to provide an output when a predetermined frequency or count has been reached. In the particular instrument identified, output takes the form of the closure of a a set of mercury-wetted contacts which, if closed, remain closed for an adjustable period of time. It will be obvious to those versed in the art that a suitable source of voltage might be connected through such relay contacts to provide an electric output signal. The count or frequency for which output is desired is set up on numbered dials of rotary switches associated with each counting decade. For example, if it were desired to provide an output upon a count or frequency of 962 cycles per second, the dials associated with the hundreds, tens and units decades of the counter would be adjusted to 9, 6 and 2, respectively. In this type of instrument the counting cycle also may be initiated by a signal or voltage applied to its reset or count-command input, as in the previous modification, and the counter will begin to count the frequency of the signal applied to its frequency counting input. If the count or frequency is below the preset or predetermined value, the output relay does not close. If the frequency is equal to, or greater than, the preset value, the output relay closes and remains closed for an adjustable period of time.

In FIGURE 1, lead wire 12 carrying alternating current signals to be counted is shown connected to the frequency counting input of preset or predetermined frequency counter 20. In addition, in this modification, lead wire 12 is shown connected by solid and dashed portions to the frequency counting input of a second preset frequency counter 22 which may be identical to counter 20.

Through solid and dashed portions of lead wire 21, output from detector 14 is shown connected to the count-command or reset inputs of both counters 20 and 22 so that output signals on lead wire 21 will initiate the counting cycles of both counters. In turn, the output relay contacts of counters 20 and 22 are shown connected through dashed lead wires 23 and 24, respectively, to gate 25. Power for the control functions of gate 25 is shown connected through lead wire 15, switch 16 and lead wire 15B to gate 25. Further, gate 25 is shown connected by dashed lead wire 17B and lead wire 17 to signalling timer 18. In this modification dashed lead wire 17A, formerly connecting detector 14 and lead wire 17, is not required. Signal output from timer 18 may be taken from output lead wire 19, whereas signal output from gate 25 may be taken from output lead wire 26. One of a number of suitable circuit arrangements for gate 25 is illustrated in detail in FIGURE 2.

With reference to FIGURE 2, gate 25 of FIGURE 1 is shown within the dashed lines as indicated. The normally-open output relays and relay contacts 20A and 22A of counters 20 and 22 are shown connected to gate 25 by lead pairs 23 and 24 respectively, as already illustrated in FIGURE 1. One terminal of battery 27, illustrative of a source of power, is shown connected through resistor 28, lead wires 23 and normally-open relay contacts 20A to one terminal of the coil of single-pole, double-throw relay 29. The other terminal of battery 27 is shown connected to the remaining terminal of the coil of relay 29. In addition, across the terminals of the coil of relay 29 are shown connected capacitor 30 and lead wires 24 leading to normally-open relay contacts 22A.

Power lead wire 15B, originating from switch 16 of FIGURE 1, is shown connected to the common or transfer contact of relay 29. When the coil of relay 29 is de-energized, as shown, lead wire 15B makes connection with lead wire 17B shown in both figures through the common and normally-closed contacts of relay 29. When the coil of relay 29 is fully energized, the relay is actuated and the connection of lead wire 15B transfers from lead wire 17B to output lead wire 26 shown in both figures.

For clarity, a brief description of the operation of gate 25 will be given before describing the overall operation of the apparatus. With reference to FIGURE 2, assume that contacts 20A of counter 20 close. Through resistor 28, voltage from battery 27 is impressed across both the coil of relay 29 and shunt-connected capacitor 30. Because of the time constants of resistor 28 and capacitor 30, there will elapse a finite time delay or interval before the voltage across the coil of relay 29 builds up sufficiently to actuate the relay and before its common contact is transferred from lead wire 17B to lead wire 26.

Contacts 22A of counter 22 are connected in shunt with the coil of relay 29. If contacts 22A close prior to the elapse of the above time interval, they will short-circuit the operating coil of relay 29, the common contact of relay 29 cannot transfer and lead wire 15B will remain connected to lead wire 17B. On the other hand, if contacts 22A of counter 22 do not close, relay 29 will be actuated after elapse of the time delay and its common contact will transfer the connection of lead wire 15B from lead wire 17B to lead wire 26.

With these added elements and their interconnections described in some detail, the operation of this modification of an embodiment of the invention will be described.

Assume that it has been established that the natural frequency of resonance vibration of each article in a series to be tested must fall within the rane of 985 to 995 cycles per second to be acceptable. The upper and lower limits of the pass band of band-pass filter 6 might be adjusted to 1000 and 980 cycles per second respectively, for example. In this modification the limits for filter 6 would be chosen mainly to insure that no articles under test would oscillate at false mode or overtone frequencies.

In addition, the hundreds, tens and units decade dials of preset counter 20 are set to the low limit of the desired frequency range, or 9, 8 and 5 respectively, representing 985 cycles per second. In turn, the hundreds, tens and units decade dials of preset frequency counter 22 are set to the high limit of the desired frequency range, or 9, 9 and 5 respectively, representing 995 cycles per second.

Assume, further, that an article whose natural frequency of resonance vibration is 975 cycles per second is placed on supports 2 and in contact with the styluses of transducers 4 and 13. At the instant of closure of switch 8 mechanical and electrical oscillations in the electromechanical feedback loop will be initiated as hereinbefore described even though the low limit of the pass band of filter 6 is 5 cycles above the natural frequency of the article. Stated in another way, the natural frequency of vibration of the article is 5 cycles outside of the pass band limits of filter 6. In this case the attenuation characteristics of filter 6, for frequencies so close outside the pass band, are inadequately sharp to provide sufficient attenuation to prevent system oscillation.

At this instant the output voltage of amplifier 11 connected by lead wire 12 to the coil of the relay of detector 14 will be below the critical operating value for the relay. Hence, the normally-open contacts of the relay will remain open and no signal will appear on lead wire 21 to actuate the count-command inputs of counters 20 and 22.

Simultaneous closure of switch 16 completes the circuit from the source of power or voltage through lead wire 15, dashed lead wire 15B, the common and normally-closed contacts of relay 29 of gate 25, lead wire 17B and lead wire 17 to the input, motor and control circuits of timer 18. Signalling timer 18 begins its predetermined run of 2 seconds, for example, as noted in the previous modification.

In a matter of milliseconds the voltage oscillations in the feedback loop on lead wire 12 build up to exceed the critical operating voltage for the relay of detector 14. Hence the relay is actuated, transferring the signal voltage of the common contact of lead wire 15 to the normally-open contact of lead wire 21 which is connected to the count-command inputs of counters 20 and 22. Signal voltage applied to the count-command inputs of counters 20 and 22 causes them to begin to count the frequency of oscillation of the feedback loop connected to their frequency counting inputs. This is 975 cycles per second, the natural frequency of resonance vibration of the article under test.

As the frequency of 975 cycles per second is below the preset value of 985 cycles per second for counter 20 and 995 cycles per second for counter 22, the output relay of neither counter closes and contacts 20A and 22A remain open. Therefore, relay 29 of gate 25 is not actuated and connection is maintained from lead wire 15B to lead wire 17B and to signalling timer 18. As a result, timer 18 runs out its predetermined interval of 2 seconds, upon elapse of which it produces a visible, audible or electric signal at output lead wire 19, signalling and indicating that the article under test is to be rejected.

Alternatively, assume that an article whose natural frequency of resonance vibration is 990 cycles per second is similarly tested. As the frequency of 990 cycles per second is above the preset value of 985 cycles per second for counter 20, the output relay of counter 20 is actuated and contacts 20A close. As the count is below the preset value of 995 cycles per second for counter 22, the output relay of counter 22 is not actuated and contacts 22A remain open. As explained hereinbefore, in connection with the detailed operation of gate 25, this action causes the common contact of relay 29 to transfer connection of lead wire 15B from lead wire 17B to lead wire 26 after a finite time delay. Loss of voltage on lead wire 17B deenergizes timer 18 prior to elapse of its pre-adjusted 2 second interval, hence timer 18 does not run out its interval and does not produce a reject signal. On the other hand, transfer of lead wire 15B to lead wire 26 of gate 25 does produce an acceptance signal at the output of gate 25.

In still another case assume that an article whose natural frequency of resonance vibration is 1000 cycles per second is similarly tested. As the frequency is above the preset value for counter 20, the output relay of counter 20 is actuated and contacts 20A close. As explained in the detailed operation of gate 25, this action impresses battery voltage through resistor 28 across both the coil of relay 29 and shunt-connected capacitor 30. Because of the time constants of the circuit there will elapse a finite time delay before relay 29 is actuated. In addition, it will be noted that the frequency also is above the preset value for counter 22. Output relay of counter 22 is actuated and relay contacts 22A close prior to elapse of the above-mentioned time delay to short-circuit the coil of relay 29 prior to its actuation. For this reason relay 29 of gate 25 is not fully energized and actuated so that connection is maintained from lead wire 15B to lead wire 17B and to signalling timer 18. Thus, timer 18 runs out its predetermined interval of 2 seconds, upon elapse of which it produces a visible, audible or electric signal at output lead wire 19, signalling and indicating that the article under test is to be rejected.

It might occur that an article under test will not vibrate because of internal flaws or the like and should be rejected. Further, some articles under test may not vibrate because their natural frequencies are sufficiently far outside the press band of filter 6. In these cases there will be no build-up of mechanical and electrical oscillations in the feedback loop upon closure of switches 8 and 16. The relay of detector 14 will not be actuated through lead wire 12 to signal counters 20 and 22 to begin to count. Both counter output relays will remain deenergized and contacts 20A and 22A will remain open permitting relay 29 to maintain circuit connection to signalling timer 18. Thus, timer 18 will run out its predetermined interval of 2 seconds, upon elapse of which it will produce a visible, audible or electric signal at output lead wire 19, signalling and indicating that the article under test is to be rejected.

In like manner it can be shown that all articles either not vibrating or vibrating at frequencies outside predetermined limits will produce a reject signal on lead wire 19 at the output of time 18, whereas those vibrating within the limits will produce an acceptance signal on lead wire 26 at the output of gate 25.

While I have shown and described in detail some embodiments of my invention, I am aware that other changes and modifications may occur to those versed in the art without departing from the invention. Therefore, it is aimed in the appended claims to cover any and all changes and modifications which fall within the true spirit and scope of the invention.

I claim:

1. An apparatus for testing articles comprising means to self-excite oscillations in said articles at natural frequencies of resonance vibration thereof, means to detect oscillations of said articles, means to signal passage of a predetermined time, means for actuating said self-exciting means and said time-signalling means, means to measure the frequency of oscillation of said articles, said frequency-measuring means and said time-signalling means being connected to detector, and oscillation-detecting means disconnecting said time-signalling means and connecting said frequency-measuring means provided said oscillations exceed a predetermined amplitude.

2. An apparatus for testing articles comprising means to self-excite oscillations in said articles at natural frequencies of resonance vibration thereof, detector means responsive to oscillations of said articles, timer means to signal passage of a predetermined time, means for actuating said self-exciting means and said timer, electronic frequency counter means to measure the frequency of oscillation of said articles, said timer and counter being connected to said detector, said detector disconnecting said timer and connecting said counter provided said oscillations exceed a predetermined amplitude.

3. An apparatus for testing articles comprising means to excite oscillations in said articles at natural frequencies of resonance vibration thereof, means to detect oscillations of said articles, means to signal passage of a predetermined time, means to initiate a test cycle connected to said oscillation-exciting and said time-signalling means, means to measure the frequency of oscillation of said articles, said frequency-measuring means and said time-signalling means being connected to the detector, said oscillation-detecting means disconnecting said time-signalling means and connecting said frequency-measuring means provided said oscillations exceed a predetermined amplitude.

4. An apparatus for testing articles comprising means to excite oscillations in said articles at natural frequencies of resonance vibration thereof, detector means responsive to oscillations of said articles, timer means to signal passage of a predetermined time, initiating means to start a test cycle, said initiating means connected to said oscillation-exciting and said time-signalling means, electronic frequency counter means to measure the frequency of oscillation of said articles, said counter and said timer being connected to the detector, said detector disconnecting said timer and connecting said counter provided said oscillations exceed a predetermined amplitude.

5. An apparatus for testing articles comprising means to excite oscillations in said articles at natural frequencies of resonance vibration thereof, a detector producing output provided said oscillations exceed a predetermined amplitude, first and second predetermined electronic counters provided with frequency-measuring and count-initiating inputs, said first counter producing output provided input frequencies exceed a predetermined low frequency limit and said second counter producing output provided input frequencies exceed a predetermined high frequency limit, a gate accommodating three input signals and having two output terminals, a source of power connected to a first input of said gate, said gate connecting the source of power to one of said two output terminals upon presence of a signal at only one of the second and third of gate inputs and connecting the source of power to the other of said two output terminals upon simultaneous presence or absence of signals at the second and third of said gate inputs, said frequency-measuring inputs of both said counters connected to the source of said oscillations, said count-initiating inputs of both said counters connected to the output of said detector and said counter outputs each connected respectively to said second and third of said gate inputs whereby power at said first output terminal of said gate corresponds to said oscillation frequencies falling between said high and low frequency limits and power at said second output terminal of said gate corresponds to said frequencies falling outside said limits.

6. An apparatus for testing articles comprising means to excite oscillations in said articles at natural frequencies of resonance vibration thereof, a detector responsive to oscillations of said articles, first and second predetermined electronic counters provided with frequency-measuring and count-initiating inputs, said first counter producing output provided input frequencies exceed a predetermined low frequency limit and said second counter producing output provided input frequencies exceed a predetermined high frequency limit, a gate accommodating three input signals and having two output terminals, a timer for signalling passage of a predetermined time, a source of power connected to a first input of said gate, said gate connecting the source of power to one of said two output terminals upon presence of a signal at only one of the second and third of said gate inputs and connecting the source of power to the other of said two output terminals upon simultaneous presence or absence of signals at the second and third of said gate inputs, said frequency-measuring inputs of both said counters connected to the source of said oscillations, said count-initiating inputs of both said counters connected to the output of said detector, said counter outputs each connected respectively to said second and third of said gate inputs and one of said gate outputs connected to said timer.

7. An apparatus responsive to electric signal frequencies comprising first and second preset electronic counters each provided with input and output connections, said first counter producing output provided the frequency of an input signal exceeds a predetermined low frequency limit and said second counter producing output provided the frequency of an input signal exceeds a predetermined high frequency limit, a gate accommodating three input signals and having two output terminals, a source of voltage connected to a first input of said gate, said gate connecting the source of voltage to one of said two output terminals upon presence of a signal at only one of the second and third of said gate inputs and connecting the source of voltage to the other of said two output terminals upon simultaneous presence or absence of signals at the second and third of said gate inputs, said counter inputs both connected to the source of said frequencies and said counter outputs each connected respectively to the second and third of said gate inputs whereby voltage at said first output terminal of said gate corresponds to said frequencies falling between said high and low frequency limits and voltage at said second output terminal of said gate corresponds to said frequencies falling outside said limits.

8. An apparatus responsive to electric signal frequencies comprising first and second predetermined digital counting channels, said channels each including inputs and outputs, a series of decade counters, means to time the counting period and means to preset different predetermined frequencies above which respective channels produce an output signal, a gate accommodating three input signals and having two output terminals, a source of power connected to a first input of said gate, said gate connecting the source of power to one of said two output terminals upon presence of a signal at only one of the second and third of said gate inputs and connecting the source of power to the other of said two output terminals upon simultaneous presence or absence of signals at the second and third of said gate inputs, said counting channel inputs both connected to a source of said electric signal frequencies and said outputs thereof each connected respectively to said second and third of said gate inputs whereby power at said first output terminal of said gate corresponds to said frequencies falling between said high and low frequency limits and power at said second output terminal of said gate corresponds to said frequencies falling outside said limits.

References Cited
UNITED STATES PATENTS

| | | | |
|---|---|---|---|
| 2,576,423 | 11/1951 | Stewart | 73—67.2 |
| 2,675,698 | 4/1954 | Johnson | 73—67.2 |
| 2,896,446 | 7/1959 | Lewis | 73—67.2 |
| 3,003,628 | 10/1961 | Diamond et al. | 73—67.2 |
| 3,029,385 | 4/1962 | Steinbrenner et al. | 73—67.2 |
| 3,043,132 | 7/1962 | Schubring | 73—67.2 |

RICHARD C. QUEISSER, *Primary Examiner.*

JAMES GILL, *Examiner.*

JOHN P. BEAUCHAMP, *Assistant Examiner.*